(12) United States Patent
Kim

(10) Patent No.: US 6,234,564 B1
(45) Date of Patent: May 22, 2001

(54) GATE GLASS OPENING AND CLOSING UNIT IN TAILGATE

(75) Inventor: Byeong-Sig Kim, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/442,623

(22) Filed: Nov. 17, 1999

(30) Foreign Application Priority Data

Apr. 13, 1999 (KR) .................................... 99-5990

(51) Int. Cl.$^7$ ........................................ B60J 5/02
(52) U.S. Cl. ..................... 296/146.8; 296/50; 296/76; 296/56
(58) Field of Search ................. 296/56, 146.8, 296/76, 50, 146.1; 292/26, 30, DIG. 43, DIG. 29, DIG. 3

(56) References Cited

U.S. PATENT DOCUMENTS

| | | | |
|---|---|---|---|
| 2,806,727 | * | 9/1957 | Johnstone .................... 292/DIG. 43 |
| 2,926,943 | * | 3/1960 | Leslie et al. .................... 292/30 |
| 4,073,170 | * | 2/1978 | Miyabayashi et al. ....... 292/DIG. 43 |
| 4,076,301 | * | 2/1978 | Gergoe .................................. 296/50 |
| 4,157,844 | * | 6/1979 | Sarosy et al. ................ 292/DIG. 43 |
| 4,202,571 | * | 5/1980 | Nishikoori ................... 292/DIG. 43 |
| 4,237,709 | * | 12/1980 | Kriigenerbet et al. ........ 292/DIG. 43 |
| 4,350,384 | * | 9/1982 | Yasuda .......................... 292/DIG. 43 |
| 4,413,854 | * | 11/1983 | Hirshberg ................................ 296/76 |
| 4,688,844 | * | 8/1987 | Hirose et al. .......................... 296/76 |
| 4,880,267 | * | 11/1989 | Ohya ...................................... 296/56 |
| 5,072,984 | * | 12/1991 | Jackson ................................. 296/56 |
| 5,195,796 | * | 3/1993 | Wampler ............................... 296/76 |
| 5,211,436 | * | 5/1993 | Feder ..................................... 296/76 |
| 5,324,092 | * | 6/1994 | Burg ...................................... 296/50 |
| 5,451,089 | * | 9/1995 | Bender .................................. 296/50 |
| 5,944,373 | * | 8/1999 | Seksaria et al. ...................... 296/50 |
| 6,000,747 | * | 12/1999 | Sehgal et al. ......................... 296/56 |

FOREIGN PATENT DOCUMENTS

| | | | | |
|---|---|---|---|---|
| 000230806 | * | 8/1987 | (EP) . | |
| 2581000 | * | 10/1986 | (FR) . | |
| 0012824 | * | 1/1983 | (JP) | ..................................... 296/76 |
| 0074723 | * | 4/1988 | (JP) . | |
| 402182538 | * | 7/1990 | (JP) . | |

* cited by examiner

Primary Examiner—Joseph D. Pape
Assistant Examiner—Kiran B. Patel
(74) Attorney, Agent, or Firm—Christie, Parker & Hale, LLP

(57) ABSTRACT

A gate glass opening and closing unit in tailgate adapted to open up or close down only a gate glass mounted at the tailgate of a van-type vehicle, the unit comprising: a glass hinge connecting a gate glass to the tailgate; a glass locking device for maintaining a locked state of the gate glass; and a glass spring for pushing up the gate glass when the locked state of the gate glass is released.

1 Claim, 6 Drawing Sheets

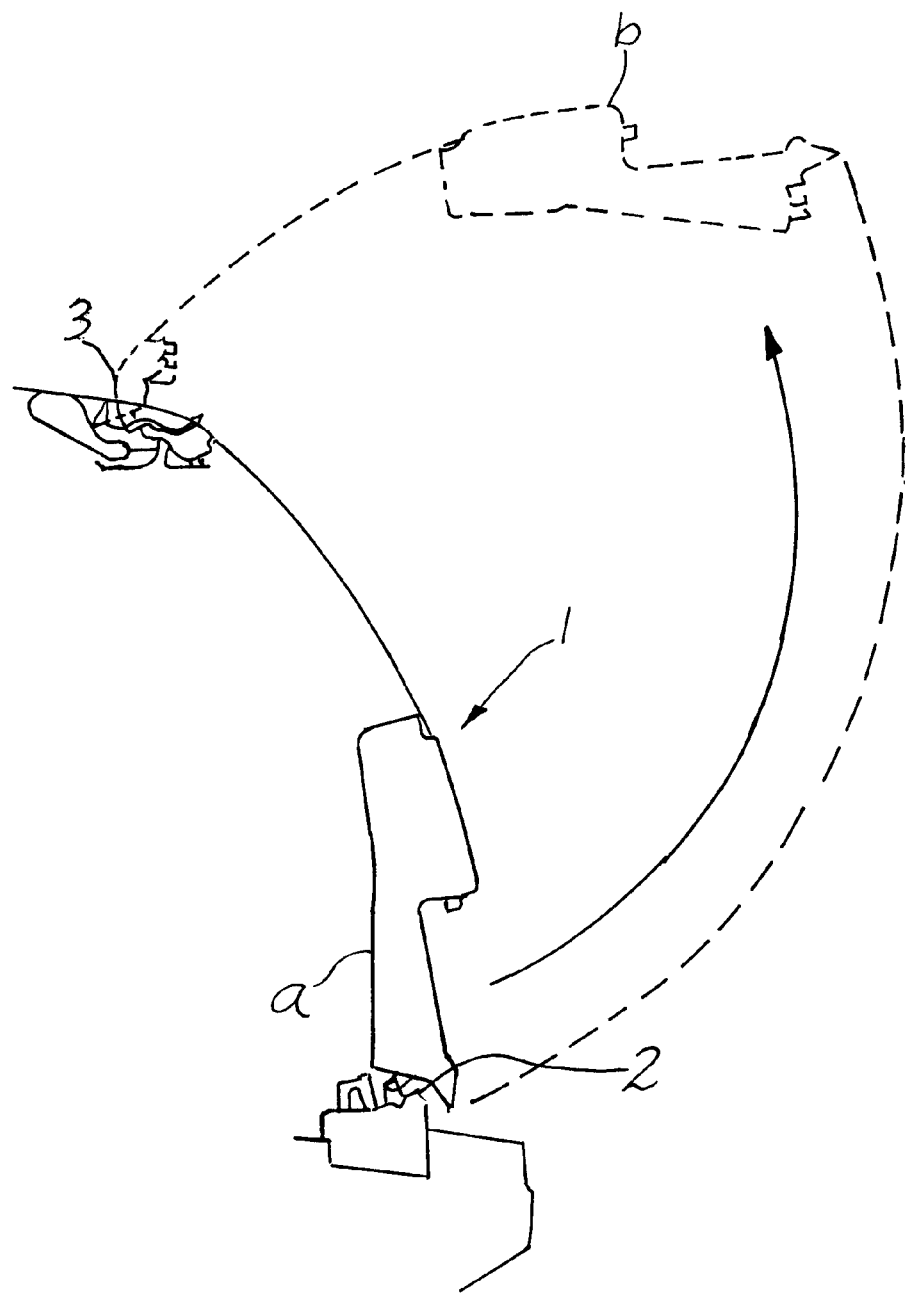

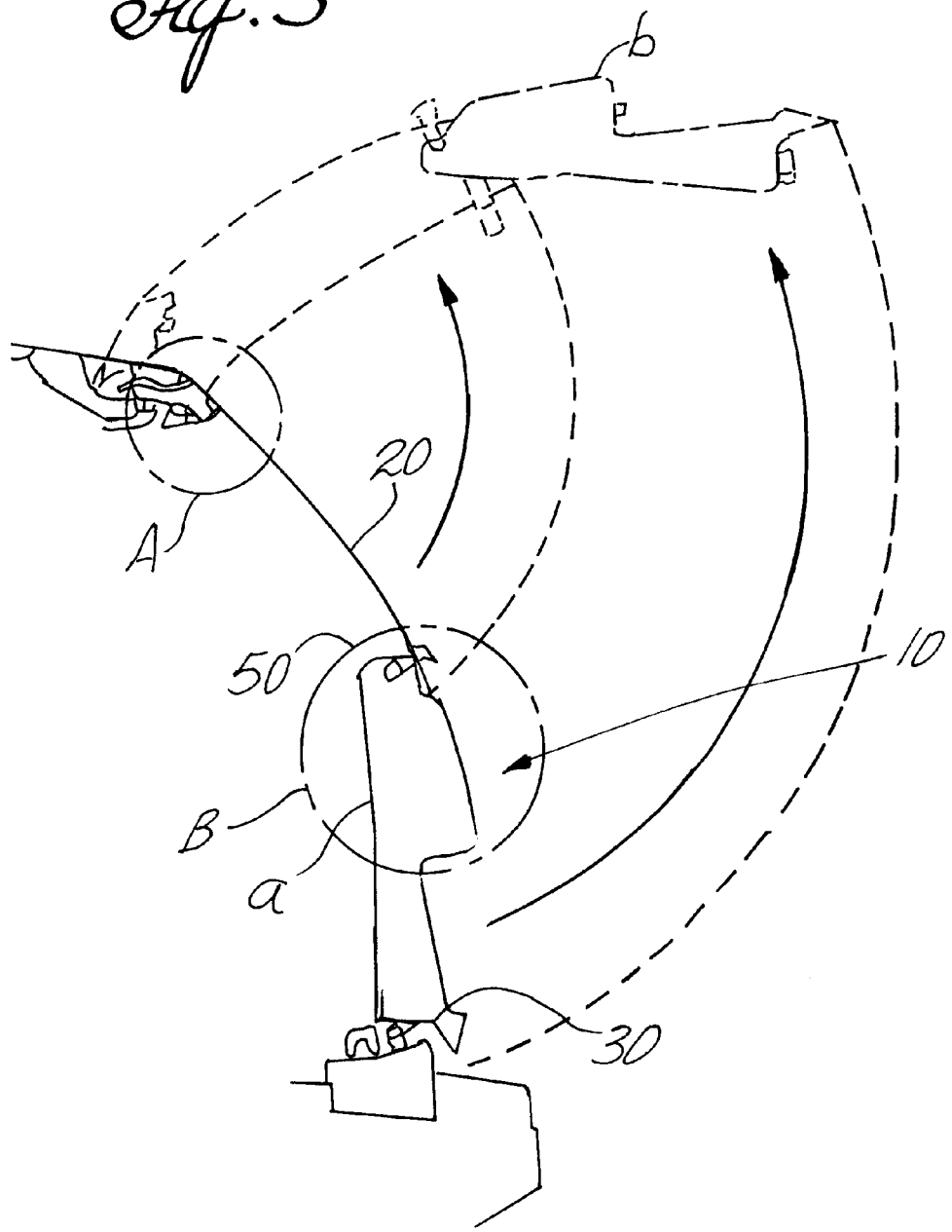

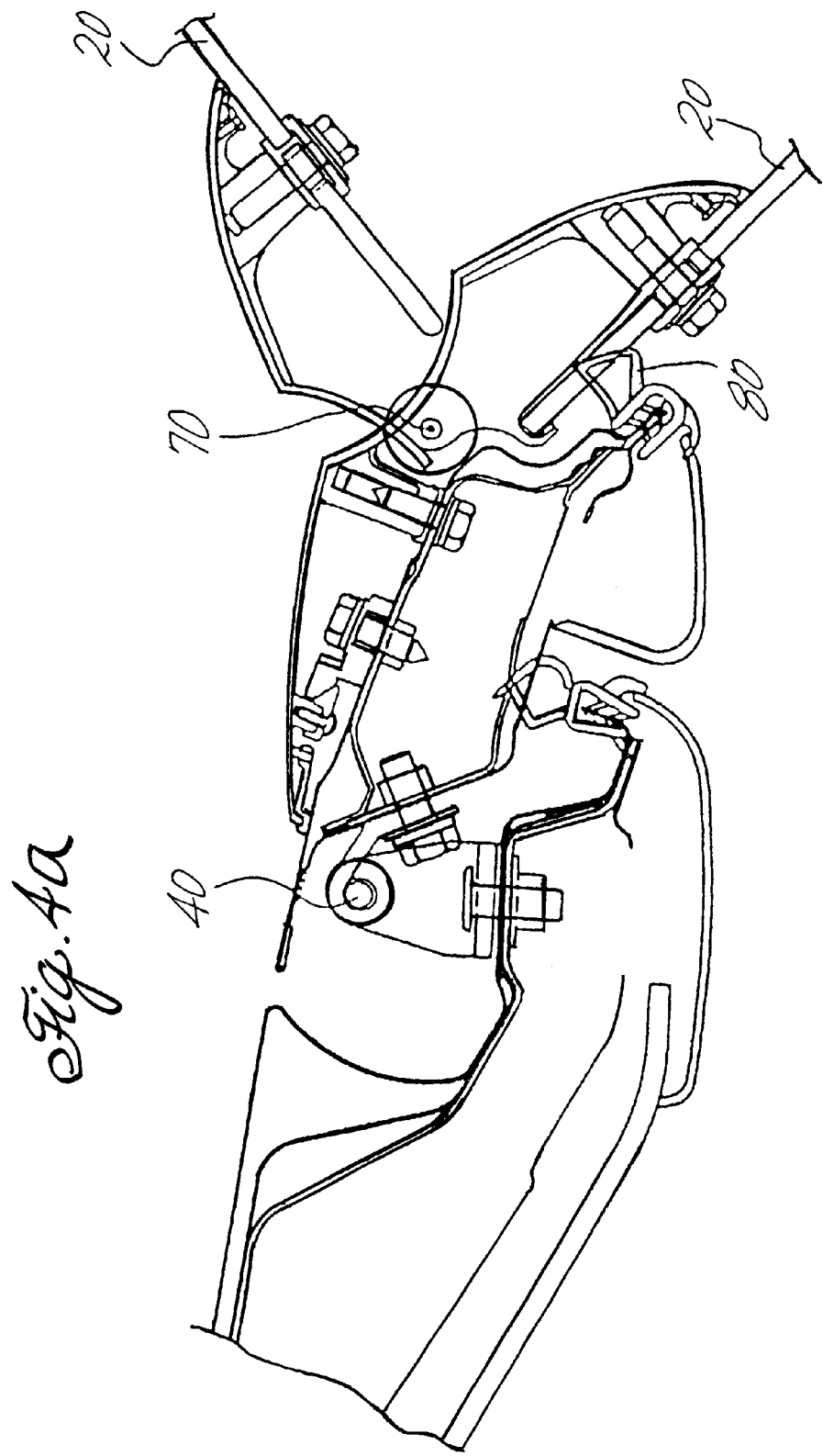

GATE GLASS OPENING AND CLOSING UNIT IN TAILGATE

BACKGROUND OF THE INVENTION

1. Field of the Invention

The present invention relates to a tailgate of a van, and more particularly to a gate glass opening and closing unit in a tailgate for opening up and closing down only the gate glass mounted at a tailgate of a van type vehicle.

2. Description of the Prior Art

Vans are manufactured by various motor companies for loading small stuffs and simultaneously for carrying passengers apart from a passenger car for carrying passengers as main purpose.

At this time, loading and unloading of stuffs are usually done through tailgate mounted at the rear end of the van. FIG. 1 is a perspective view for illustrating a rear end of a van type vehicle and FIG. 2 is a sectional view of tailgate, where reference numeral 1 in FIG. 1 is the tailgate of the van. Now, operational method of the tailgate will be described with reference to FIG. 2.

The tailgate 1 is mounted thereunder with a locking device 2 for opening and closing the tailgate 1. The locking device 2 is generally used for any vehicle, such that construction and operation thereof will be omitted in their details.

When the locking device 2 is manipulated to release a closed state (a) of the tailgate 1, a locking device at the body of a vehicle is released to push up the tailgate 1 according to a resilient body such as spring mounted on the body. The tailgate 1 is rotated around a hinge 3 connecting an upper part of the body to the tailgate 1 by the action of the resilient body to allow the tailgate 1 to be opened in a state (b).

The van mounted with the tailgate operating as mentioned above should secure a space as long as the length of the tailgate when the tailgate is opened or closed for loading or unloading freight. Consequently, there is a problem in loading or unloading merchandise in a city where parking lot is difficult in obtainment. Furthermore, there is another problem in that the tailgate should be opened to its full extent even when a small stuff is loaded or unloaded.

SUMMARY OF THE INVENTION

The present invention is disclosed to solve the aforementioned problems and it is an object of the present invention to provide a gate glass opening and closing unit in tailgate adapted to open up or close down a gate glass at the tailgate according to manipulation of a driver or a passenger.

In accordance with the object of the present invention, there is provided a gate glass opening and closing unit in tailgate mounted at a rear end of a van-type vehicle, the unit comprising:
- a glass hinge connecting a gate glass to the tailgate;
- a glass locking device for maintaining a locked state of the gate glass; and
- a glass spring for pushing up the gate glass when the locked state of the gate glass is released.

BRIEF DESCRIPTION OF THE DRAWINGS

For fuller understanding of the nature and objects of the invention, reference should be made to the following detailed description taken in conjunction with the accompanying drawings in which:

FIG. 2 is a sectional view of tailgate mounted on a van type vehicle;

FIG. 3 is a sectional view of gate glass opening and closing unit in a tailgate according to the present invention;

FIG. 4a is a detailed drawing of "A" part in FIG. 3;

DETAILED DESCRIPTION OF THE INVENTION

Preferred embodiment of the present invention will now be described in detail with reference to the accompanying drawings.

With regard to opening and closing method of a tailgate 10 according to the present invention, when a locking device 30 is manipulated to release the closeness of the tailgate as in the prior art, the tailgate 10 is rotated around a gate hinge 40 connecting the tailgate 10 and the upper part of the body and is opened.

Figure 1:
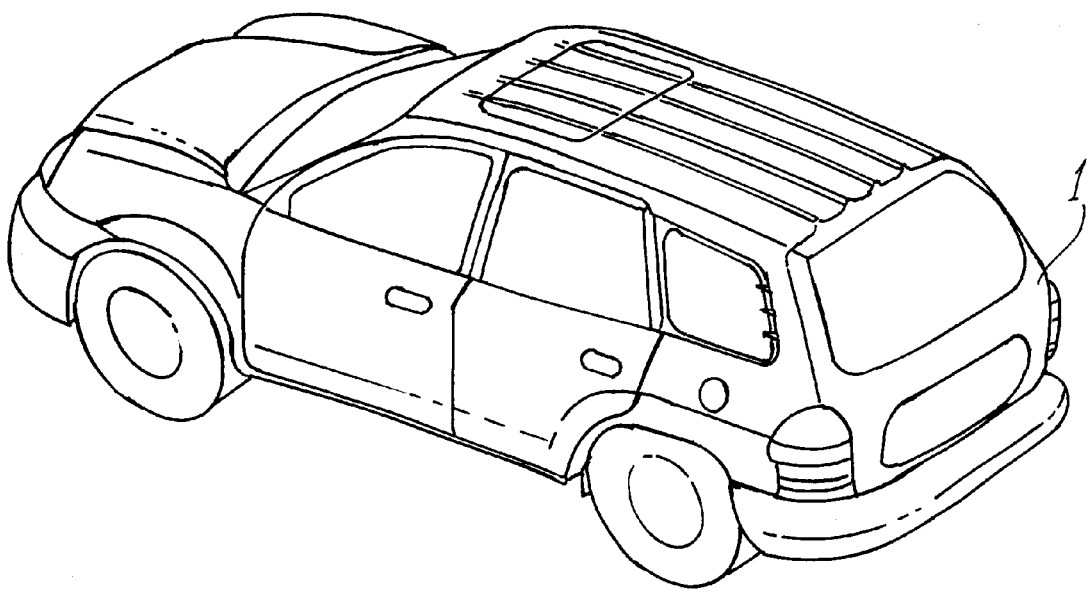
FIG. 1 is a perspective view for illustrating a rear end of a van type vehicle.
Figure 4B:
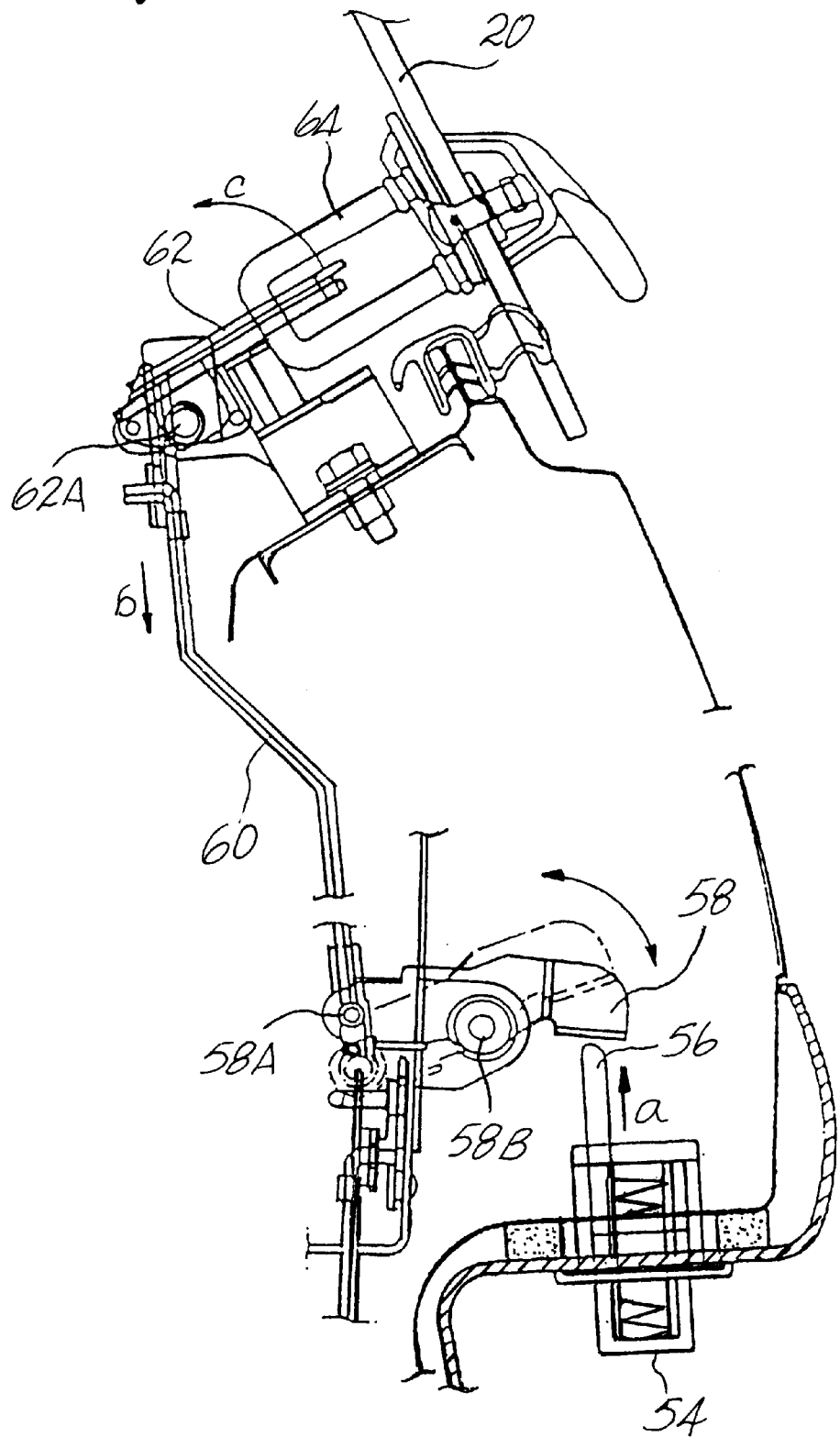
FIG. 4b is a detailed drawing of "B" part in FIG. 3.

Meanwhile, a gate glass 20 mounted at the tailgate 10 is constructed as below: As illustrated in FIG. 4a, the gate glass 20 is attached thereon with a glass hinge 70 to connect the tailgate 10 and the gate glass 20. FIG. 4b illustrates a button 54 for releasing locked state of the glass locking device 50 and a glass locking device 50 disposed at a lower side of the gate glass 20.

The button 54 is mounted with a first rod 56 of a straight line shape and the first rod 56 is connected to a tip end of a second rod 58 rotating around a first rotary shaft 58b. The other end where the first and the second rod 56 and 58 join is connected to a third rod 60 and the second rod 58 by way of a second rotary shaft 58a. The third rod 60 is connected at an upper part thereof to a tip end of a lever 62 and to a third rotary shaft 62a, and the other end of the lever 62 is inserted into a lock 64.

Now, operation a of the present invention will be described.

When a passenger or a driver presses the button 54 mounted on an external panel of the tailgate 10, the first rod 56 connected to the button 54 is moved to "a" direction to apply a force to a tip end of the second rod 58 contacting the first rod 56 and to rotate the second rod 58. The other end of the second rod 58 is connected to the third rod 60 via the rotary shaft 58a, such that rotation of the second rod 58 actuates the third rod 60 to "b" direction.

The lever 62 is moved to "c" direction by the operation of the third rod 60 to slip out of the lock 64, thereby releasing the locked state of the gate glass 20.

When the locked state of the gate glass 20 is released, force for fixing the gate glass 20 is removed, such that force for pushing up the gate glass 20 by way of gate glass spring 80 disposed at an upper part of the tailgate 10 is actuated. The gate glass 20 is rotated around glass hinge shaft 70 by the actuation of the gate glass spring 80, as illustrated in FIG. 3, to thereby open the gate glass 20.

Figure 5:
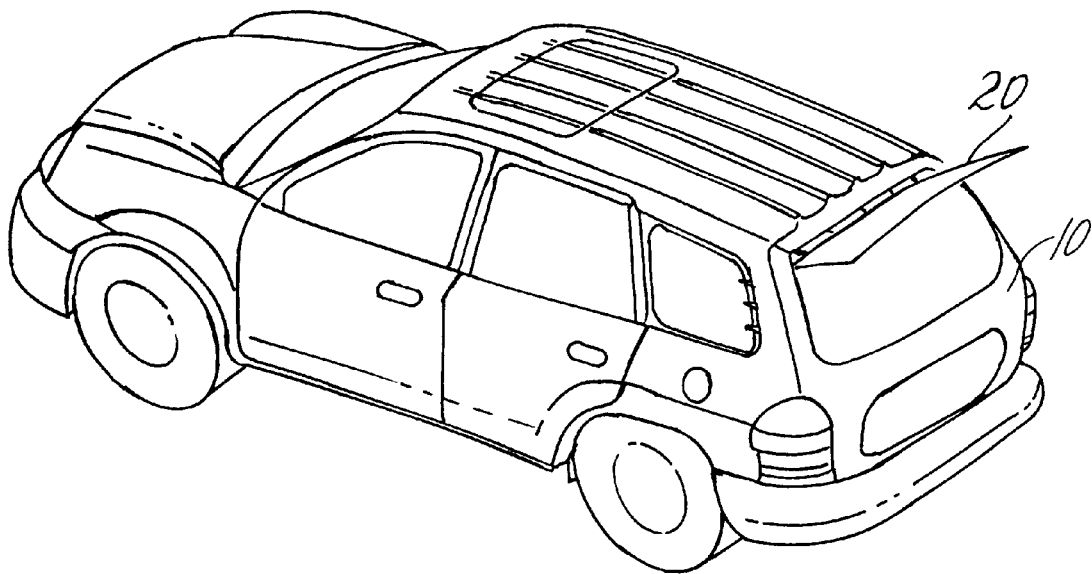
FIG. 5 is a perspective view for illustrating openness and closeness of gate glass by the gate glass opening and closing unit of the tailgate according to the present invention.

FIG. 5 is a perspective view for illustrating openness and closeness of gate glass by the gate glass opening and closing unit of the tailgate according to the present invention, where the gate glass 20 maintains the openness by way of the force of the gate glass spring 80 unless the gate glass 20 is closed by the driver or the passenger by way of a separate manipulation.

As apparent from the foregoing, there is an advantage in the gate glass opening and closing unit in a tailgate according to the present invention in that a gate glass at the tailgate mounted at a rear end of a van-type vehicle is opened by manipulation of a passenger to expedite the loading and unloading of small freight with ease.

What is claimed is:

1. A tailgate assembly for use in van-type vehicles, the assembly comprising:
   a tailgate;
   a gate glass;
   a gate glass hinge connecting the gate glass to the tailgate;
   a gate glass locking device for maintaining the gate glass in a locked state comprising:
      a button for releasing the locked state of the gate glass;
      a first rod of straight line shape attached to the button;
      a second rod connected at one end thereof to the first rod to rotate around a first rotary shaft;
      a third rod connected at the other end thereof to the second rod via a second rotary shaft;
      a lever connected at one end thereof to an upper part of the third rod via a third rotary shaft while inserted at the other end thereof into a lock; and
   a gate glass spring for pushing up the gate glass, when the locked state of the gate glass is released.

* * * * *